(12) United States Patent
Posamentier et al.

(10) Patent No.: US 9,121,968 B2
(45) Date of Patent: *Sep. 1, 2015

(54) EXTRACTING GEOLOGIC INFORMATION FROM MULTIPLE OFFSET STACKS AND/OR ANGLE STACKS

(75) Inventors: Henry W. Posamentier, The Woodlands, TX (US); Cung Khac Vu, Houston, TX (US); James P. DiSiena, Houston, TX (US); Todd Dygert, Kingwood, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 13/018,044

(22) Filed: Jan. 31, 2011

(65) Prior Publication Data

US 2012/0197532 A1 Aug. 2, 2012

(51) Int. Cl.
*G06F 19/00* (2011.01)
*G01V 1/34* (2006.01)

(52) U.S. Cl.
CPC ............ *G01V 1/345* (2013.01); *G01V 2210/61* (2013.01); *G01V 2210/632* (2013.01)

(58) Field of Classification Search
USPC .......................................................... 702/14
See application file for complete search history.

(56) References Cited

U.S. PATENT DOCUMENTS

| 6,757,217 B2 | 6/2004 | Eastwood |
| 6,823,266 B2 | 11/2004 | Czernuszenko |
| 2003/0110018 A1* | 6/2003 | Dutta et al. ..................... 703/10 |
| 2010/0177595 A1 | 7/2010 | Khare et al. |
| 2010/0186950 A1 | 7/2010 | Neelamani |

OTHER PUBLICATIONS

Merriam-Webster-stack, p. 1, printed Mar. 11, 2015.*
International Search Report and Written Opinion for PCT/US2012/022903 mailed Sep. 28, 2012 [T-8160].
U.S. Office Action dated Nov. 20, 2014 for U.S. Appl. No. 13/017,995.
U.S. Notice of Allowance dated Dec. 5, 2014 for U.S Appl. No. 13/017,995.

* cited by examiner

*Primary Examiner* — Tung S Lau
(74) *Attorney, Agent, or Firm* — Pillsbury Winthrop Shaw Pittman, LLP

(57) ABSTRACT

Geologic information may be extracted from multiple offset stacks and/or angle stacks. Offset stacks and/or angle stacks may be received that represent energy that has propagated through a geologic volume of interest from energy sources to energy receivers. Attribute volumes associated with individual source-receiver offsets and/or source-receiver angles may be determined based on corresponding offset stacks and/or angle stacks. For individual offset stacks or angle stacks, corresponding sets of geologic features represented in the attribute volumes may be identified. The sets of geologic features corresponding to the different offset stacks and/or angle stacks to may be compared to determine discrepancies and/or similarities between the sets of geologic features corresponding to the different offset stacks and/or angle stacks. Stratigraphic interpretations, stratigraphic predictions, and/or other interpretations and/or predictions may be determined based on causes of the discrepancies and/or similarities.

27 Claims, 4 Drawing Sheets

EXTRACTING GEOLOGIC INFORMATION FROM MULTIPLE OFFSET STACKS AND/OR ANGLE STACKS

FIELD OF THE DISCLOSURE

This disclosure relates to extracting geologic information related to a geologic volume of interest by leveraging discrepancies and/or similarities of corresponding geologic features included in a plurality of offset stacks and/or angle stacks associated with the geologic volume of interest.

BACKGROUND OF THE DISCLOSURE

Seismic data has been used to attempt to predict spatial distribution of lithology as well as stratigraphic architecture in geologic volume of interest using various images extracted from the seismic data. Conventional workflows include choosing a single offset stack or angle stack from among several available offset stacks and/or angle stacks and making interpretations using the selected offset stack or angle stack. One conventional workflow involves the use of offset stacking or angle stacking methodology. Seismic data is processed using the best estimates of velocity information for a geologic volume of interest. Stacked volumes comprising multi-offset or multi-angle seismic volumes are generated. After examination of each of these volumes, human interpreters commonly select the volume that they believe most faithfully illustrates the key geologic attributes critical to their subsequent analyses. Using their chosen volume, human interpreters commonly assess patterns observed and draw geologic conclusions based on their analyses. Conventional workflows are limited, for example, because some geological attributes of interest may be shown in some generated volumes, but not in others.

SUMMARY

One aspect of this disclosure relates to a computer-implemented method for analyzing attributes to identify geologic features within a geologic volume of interest. The method may include obtaining an attribute volume representing an attribute of the geologic volume of interest. The attribute volume may have been formed from a plurality of offset stacks and/or angle stacks that represent energy that has propagated through the geologic volume of interest from one or more energy sources to one or more energy receivers. An individual energy source may be physically separated from an individual energy receiver by a corresponding source-receiver offset. Each individual offset stack may be formed from a corresponding set of seismic traces having substantially equivalent source-receiver offsets. Each individual angle stack being formed from corresponding sets of seismic traces having substantially equivalent source-receiver angles. The method may include flattening the attribute volume according to time, depth, slope, vertical, dip, dip azimuth, horizon, or relative to an interpreted horizon. The method may include generating a sequence of slices from the flattened attribute volume. The method may include identifying separate geologic features represented in the slices based on a sequential analysis of the slices.

Another aspect of this disclosure relates to a system configured to analyze attributes to identify geologic features within a geologic volume of interest. The system may include one or more processors configured to execute computer program modules. The computer program modules may include an image volume module, a feature identification module, and/or other modules. The image volume module may be configured to obtain an attribute volume representing an attribute of the geologic volume of interest. The attribute volume may have been formed from a plurality of offset stacks and/or angle stacks that represent energy that has propagated through the geologic volume of interest from one or more energy sources to one or more energy receivers. An individual energy source may be physically separated from an individual energy receiver by a corresponding source-receiver offset. Each individual offset stack may be formed from a corresponding set of seismic traces having substantially equivalent source-receiver offsets. Each individual angle stack may be formed from corresponding sets of seismic traces having substantially equivalent source-receiver angles. The image volume module may be further configured to flatten the attribute volume according to time, depth, slope, vertical, dip, dip azimuth, horizon, or relative to an interpreted horizon. The image volume module may be further configured to generate a sequence of slices from the flattened attribute volume. The feature identification module may be configured to identify separate geologic features represented in the slices based on a sequential analysis of the slices.

Yet another aspect of this disclosure relates to a computer-readable storage medium having instructions embodied thereon. The instructions may be executable by a processor to perform a method for analyzing attributes to identify geologic features within a geologic volume of interest. The method may include obtaining an attribute volume representing an attribute of the geologic volume of interest. The attribute volume may have been formed from a plurality of offset stacks and/or angle stacks that represent energy that has propagated through the geologic volume of interest from one or more energy sources to one or more energy receivers. An individual energy source may be physically separated from an individual energy receiver by a corresponding source-receiver offset. Each individual offset stack may be formed from a corresponding set of seismic traces having substantially equivalent source-receiver offsets. Each individual angle stack may be formed from corresponding sets of seismic traces having substantially equivalent source-receiver angles. The method may include flattening the attribute volume according to time, depth, slope, vertical, dip, dip azimuth, horizon, or relative to an interpreted horizon. The method may include generating a sequence of slices from the flattened attribute volume. The method may include identifying separate geologic features represented in the slices based on a sequential analysis of the slices.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the technology. As used in the specification and in the claims, the singular form of "a", "an", and "the" include plural referents unless the context clearly dictates otherwise.

DETAILED DESCRIPTION

Figure 1:
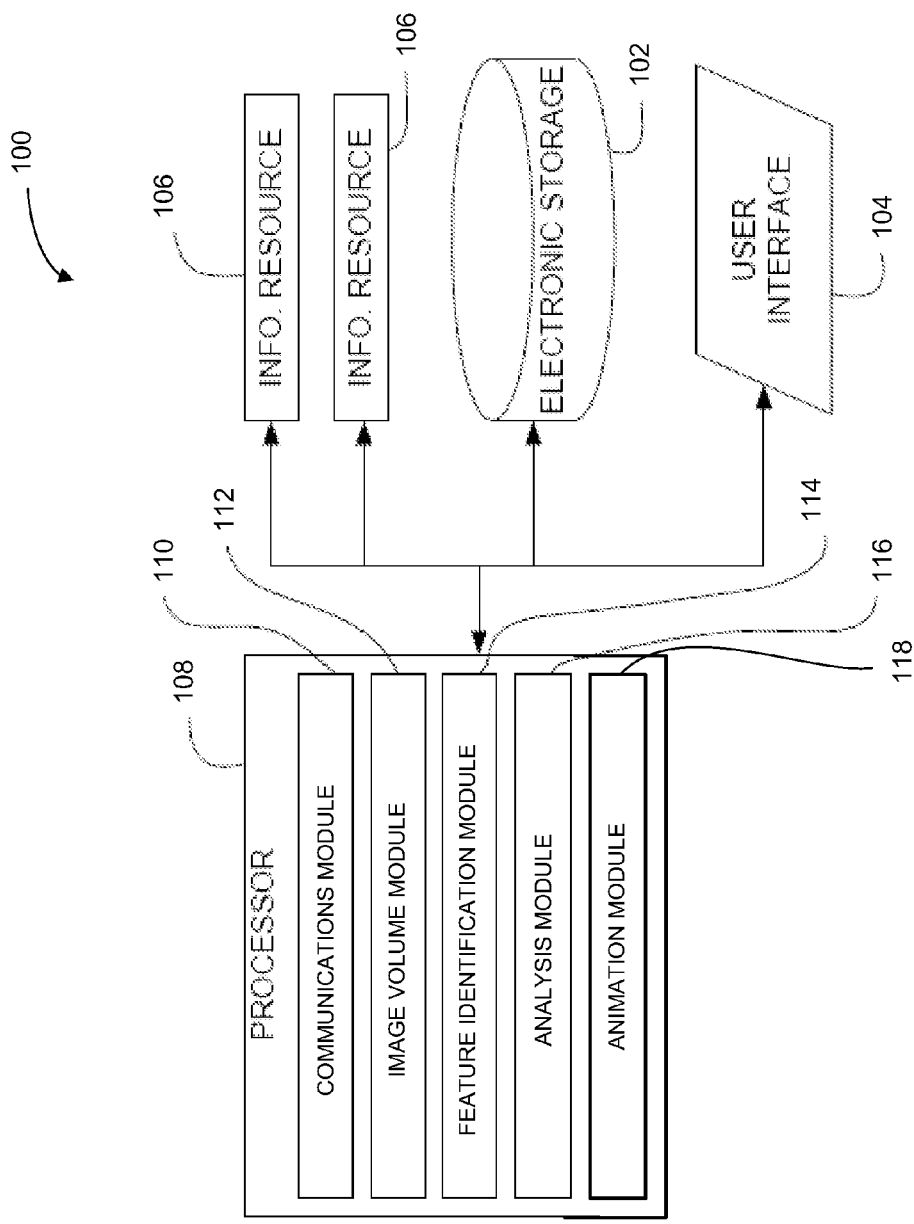
FIG. 1 illustrates a system configured to extract geologic information related to a geologic volume of interest by leveraging discrepancies and/or similarities of corresponding geologic features included in a plurality of offset stacks and/or angle stacks associated with the geologic volume of interest, in accordance with one or more embodiments.

The present technology may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present technology may be coded in different languages for application in a variety of computing platforms and environments. It will be appreciated that the scope and underlying principles of the present technology are not limited to any particular computer software technology.

Moreover, those skilled in the art will appreciate that the present technology may be practiced using any one or combination of hardware and software configurations, including but not limited to a system having single and/or multi-processor computer processors system, hand-held devices, programmable consumer electronics, mini-computers, mainframe computers, and the like. The technology may also be practiced in distributed computing environments where tasks are performed by servers or other processing devices that are linked through one or more data communications networks. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present technology. Such devices and articles of manufacture also fall within the spirit and scope of the present technology.

Referring now to the drawings, embodiments of the present technology will be described. The technology can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present technology are discussed below. The appended drawings illustrate only typical embodiments of the present technology and therefore are not to be considered limiting of its scope and breadth.

FIG. 1 illustrates a system 100 configured to extract geologic information related to a geologic volume of interest by leveraging discrepancies and/or similarities of corresponding geologic features included in a plurality of offset stacks and/or angle stacks associated with the geologic volume of interest, in accordance with one or more embodiments. Exemplary embodiments involve analyzing geologically-significant images associated with the geologic volume of interest to identify discrepancies and/or similarities therebetween. Determining one or more causes of these discrepancies and/or similarities can yield insights with respect to lithology prediction, stratigraphic architecture, and/or other aspects of the geologic volume of interest. By leveraging discrepancies and/or similarities of geologic features identified in the images, interpretations and/or predictions relating to lithology, stratigraphy, and/or other aspects of the geologic volume of interest may be improved relative to conventional workflows. For example, some embodiments may utilize an assumption that certain geologic features can be imaged better in certain offset domains whereas other geologic features are not affected by offset. Exemplary embodiments involve analysis of multiple offset stacks and/or angle stacks rather than a single offset stack or angle stack. Details relating to the lithology and stratigraphy of a given geologic feature that would not be evident from a single offset stack or angle stack may be readily identified and explained using multiple offset stacks and/or angle stacks, thus leading to significantly more robust geological interpretations. According to some embodiments, individual ones of the offset stacks and/or the angle stacks may include processed data, migrated data, unmigrated data, imaged data, and/or raw data. In one embodiment, the system 100 comprises electronic storage 102, a user interface 104, one or more information resources 106, one or more processors 108, and/or other components.

In one embodiment, the electronic storage 102 comprises electronic storage media that electronically stores information. The electronic storage media of the electronic storage 102 may include system storage that is provided integrally (i.e., substantially non-removable) with the system 100 and/or removable storage that is removably connectable to the system 100 via, for example, a port (e.g., a USB port, a firewire port, etc.) or a drive (e.g., a disk drive, etc.). The electronic storage 102 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 102 may store software algorithms, information determined by the processor 108, information received via the user interface 104, information received from the information resources 106, and/or other information that enables the system 100 to function as described herein. The electronic storage 102 may be a separate component within the system 100, or the electronic storage 102 may be provided integrally with one or more other components of the system 100 (e.g., the processor 108).

The user interface 104 is configured to provide an interface between the system 100 and a user through which the user may provide information to and receive information from the system 100. This enables data, results, and/or instructions and any other communicable items, collectively referred to as "information," to be communicated between the user and the system 100. As used herein, the term "user" may refer to a single individual or a group of individuals who may be working in coordination. Examples of interface devices suitable for inclusion in the user interface 104 include one or more of a keypad, buttons, switches, a keyboard, knobs, levers, a display screen, a touch screen, speakers, a microphone, an indicator light, an audible alarm, and/or a printer. In one embodiment, the user interface 104 actually includes a plurality of separate interfaces.

It is to be understood that other communication techniques, either hard-wired or wireless, are also contemplated by the present technology as the user interface 104. For example, the present technology contemplates that the user interface 104 may be integrated with a removable storage interface provided by the electronic storage 102. In this example, information may be loaded into the system 100 from removable storage (e.g., a smart card, a flash drive, a removable disk, etc.) that enables the user to customize the implementation of the system 100. Other exemplary input devices and techniques adapted for use with the system 100 as the user interface 104 include, but are not limited to, an RS-232 port, RF link, an IR link, modem (telephone, cable or other). In short, any technique for communicating information with the system 100 is contemplated by the present technology as the user interface 104.

The information resources 106 include one or more sources of information related to the geologic volume of interest. By way of non-limiting example, one of information resources 106 may include seismic data acquired at or near the geological volume of interest, information derived therefrom, and/or information related to the acquisition. Such seismic data may include source wavefields and receiver wavefields. The seismic data may include individual traces of seismic data (e.g., the data recorded on one channel of seismic energy propagating through the geological volume of interest from a source), offset stacks, angle stacks, azimuth stacks, and/or other data. The information derived from the seismic data may include, for example, geologic models from seismic data representing energy that has propagated through the geologic volume of interest from one or more energy sources to one or more energy receivers, image volumes from the geologic model representing geologic features present in the geologic volume of interest, and/or other information. Individual ones of the image volumes may correspond to individual ones of the offset stacks, angle stacks, azimuth stacks, and/or other information. Information related to the acquisition of seismic data may include, for example, data related to the position and/or orientation of a source of seismic energy, the positions and/or orientations of one or more detectors of seismic energy, the time at which energy was generated by the source and directed into the geological volume of interest, and/or other information.

The processor 108 is configured to provide information processing capabilities in the system 100. As such, the processor 108 may include one or more of a digital processor, an analog processor, a digital circuit designed to process information, an analog circuit designed to process information, a state machine, and/or other mechanisms for electronically processing information. Although the processor 108 is shown in FIG. 1 as a single entity, this is for illustrative purposes only. In some implementations, the processor 108 may include a plurality of processing units. These processing units may be physically located within the same device or computing platform, or the processor 108 may represent processing functionality of a plurality of devices operating in coordination.

As is shown in FIG. 1, the processor 108 may be configured to execute one or more computer program modules. The one or more computer program modules may include one or more of a communications module 110, an image volume module 112, a feature identification module 114, an analysis module 116, an animation module 118, and/or other modules. The processor 108 may be configured to execute modules 110, 112, 114, 116, and/or 118 by software; hardware; firmware; some combination of software, hardware, and/or firmware; and/or other mechanisms for configuring processing capabilities on the processor 108.

It should be appreciated that although the modules 110, 112, 114, 116, and 118 are illustrated in FIG. 1 as being co-located within a single processing unit, in implementations in which the processor 108 includes multiple processing units, one or more of the modules 110, 112, 114, 116, and/or 118 may be located remotely from the other modules. The description of the functionality provided by the different modules 110, 112, 114, 116, and/or 118 described below is for illustrative purposes, and is not intended to be limiting, as any of the modules 110, 112, 114, 116, and/or 118 may provide more or less functionality than is described. For example, one or more of the modules 110, 112, 114, 116, and/or 118 may be eliminated, and some or all of its functionality may be provided by other ones of the modules 110, 112, 114, 116, and/or 118. As another example, the processor 108 may be configured to execute one or more additional modules that may perform some or all of the functionality attributed below to one of the modules 110, 112, 114, 116, and/or 118.

The communications module 110 may be configured to receive information. Such information may be received from the information resources 106, the user via the user interface 104, the electronic storage 102, and/or other information sources. Examples of received information may include seismic data, information derived from seismic data, information related to the acquisition of seismic data, angle stacks, azimuth stacks, image volumes, information related to attributes, and/or other information.

In some embodiments, the communications module 110 may be configured to receive one or more offset stacks and/or angle stacks. An offset stack or angle stack may represent energy that has propagated through the geologic volume of interest from one or more energy sources to one or more energy receivers. An individual energy source may be physically separated from an individual energy receiver by a corresponding source-receiver offset. Each individual offset stack may be formed from a corresponding set of seismic traces having substantially equivalent source-receiver offsets. Each individual angle stack may be formed from corresponding sets of seismic traces having substantially equivalent source-receiver angles.

The communications module 110 may be configured to obtain one or more attribute volumes, according to some embodiments. An attribute volume may represent one or more attributes associated with the geologic volume of interest. An individual attribute volume may have been formed from one or more offset stacks and/or angle stacks. Attribute volumes are described further in connection with the image volume module 112.

The communications module 110, in accordance with some embodiments, may be configured to receive one or more geologic models. Generally speaking, a geologic model may include a conceptual, three-dimensional construction representing various aspects of a geologic volume of interest. Geologic models may be used to make predictions and/or compare observations with assumptions related to the geologic volume of interest. Geologic models may be constructed from incomplete data such that voids in data are estimated. The geologic model may be derived from and/or based on seismic data representing energy that has propagated through the geologic volume of interest from one or more energy sources to one or more energy receivers. The seismic data may include one or more of a plurality of offset stacks, a plurality of angle stacks, a plurality of azimuth stacks, and/or other seismic data. The geologic model may include geologic features identified therein.

Information received by the communications module 110 may be utilized by one or more of modules 112, 114, 116, and/or 118. Examples of some such utilizations are described below. The communication module 110 may be configured to transmit information to one or more other components of the system 100.

The image volume module 112 may be configured to generate and/or otherwise obtain one or more image volumes. In general, image volumes are three-dimensional visual representations of one or more aspects of a geologic model. An individual image volume may correspond to individual offset stacks; angle stacks; azimuth stacks; transforms of offset stacks, angle stacks, and/or azimuth stacks (e.g., spectral decomposition and/or other transforms); and/or other information. Image volumes may represent geologic features (described further in connection with the feature identification module 114) present in the geologic volume of interest.

An image volume may include an attribute volume. The attribute volume may be descriptive of a spatial distribution and/or temporal distribution within the geologic volume of interest of one or more attributes. Attributes may include, for example, one or more of velocity, coherence, Hilbert transform, amplitude, instantaneous frequency, spectral decomposition, anisotropy, attenuation, impedance, density, Poisson's ratio, acoustic properties, elastic properties, petrophysical properties, rock properties, fluid properties, reservoir properties, seismic response, geologic description, lithologic classification, dip, magnitude, curvature, roughness, dip azimuth, spectral shape, and/or other information attributable to geologic volumes and/or geologic features. According to some embodiments, generating and/or obtaining the attribute volume may include utilizing one or more of borehole-derived information, seismic data used to obtain the geologic model, and/or other information.

An attribute volume may be generated and/or obtained based on spatially aligned geologically consistent volumes associated with the geologic volume of interest. An attribute volume may be formed from a plurality of offset stacks and/or angle stacks that represent energy that has propagated through the geologic volume of interest from one or more energy sources to one or more energy receivers. A plurality of attribute volumes associated with individual source-receiver offsets and/or source-receiver angles may be determined based on corresponding offset stacks and/or angle stacks.

The image volume module 112 may be configured to obtain one or more slices through an image volume. Slices through the image volume may be arranged as a logical sequence of slices. The slices may include common-time slices, common-depth slices, common-slope slices, common-vertical slices, common-horizon slices, and/or other slices. Prior to obtaining the slices, according to some embodiments, the image volume module 112 may flatten the image volume according to time, depth, slope, vertical, horizon, dip, dip azimuth, an interpreted horizon, and/or other metric.

The image volume module 112 may be configured to generate one or more optical stack volumes. An individual optical stack volume may include two or more slices. As such, a given optical stack volume may correspond to a thickness range of an attribute volume from which the slices were obtained. According to some embodiments, slices may be viewed from one or more directions by a user and may be stacked based on visual inspection by a user to yield optical stack volumes. In some embodiments, slices may be stacked automatically to yield optical stack volumes. Opacity and/or transparency of one or more slices included in the given optical stack volume may be adjusted. In some embodiments, opacity and/or transparency criteria associated with individual slices and/or groups of slices may be based on user input or determined automatically. Modifying opacity of individual slices included in the given optical stack volume may emphasize one or more geologic features included in the corresponding thickness range of the attribute volume from which the slices were obtained.

The image volume module 112 may be configured to segment an image volume. Segmentation may reduce computational costs. Such segmentation may be performed according to geologic features represented in the image volume and/or other subdivision of the image volume. That is, a given segment may correspond to one or more geologic features, or a given segment may correspond to some other subdivision of the image volume. A segment of an image volume may be processed similar to the processing of image volumes described herein. For example, the image volume module 112 may be configured to obtain one or more slices through a segment of an image volume.

The feature identification module 114 may be configured to identify geologic features within individual image volumes. Examples of geologic features may include a fluvial channel, delta, deltaic fan, submarine fan, reef, sandbar, point bar, fault, unconformity, dike, sill, salt body, crevasse splay, reservoir flow unit, fluid contact, turbidite channel, turbidite sheet, and/or other types of geological features. In some embodiments, the feature identification module 114 may be configured to individually and/or collectively analyze the attribute volumes to identify geologic features within the geologic volume of interest represented in the individual attribute volumes. The feature identification module 114 may be configured to identify, for individual offset stacks or angle stacks, corresponding sets of geologic features represented in the attribute volumes determined from the individual offset stacks or angle stacks. The feature identification module 114 may be configured to compare corresponding geologic features represented in different ones of the individual attribute volumes to determine discrepancies and/or similarities between the corresponding geologic features. The different ones of the individual attribute volumes may correspond to different offset stacks and/or angle stacks.

The feature identification module 114 may be configured to determine a set of geologic features within the geologic volume of interest from the identified geologic features represented in the individual attribute volumes. According to some embodiments, the feature identification module 114 may be configured to identify geologic features from an animation associated with the geologic volume of interest. Such animations are described further in connection with the animation module 118. Determining the set of geologic features within the geologic volume of interest may be based on the discrepancies and/or similarities between the corresponding geologic features represented in the different ones of the individual attribute volumes.

As mentioned above, a segment of an image volume may be processed similar to the processing of image volumes described herein. For example, in embodiments where slices through the image volumes are obtained by the image volume module 112, geologic features may be identified by the feature identification module 114 on an individual slice basis. In some embodiments, separate geologic features represented in the slices may be identified based on a sequential analysis of the slices. Such a sequential analysis of the slices may include identifying geologic features from an animation associated with the geologic volume of interest (described further in connection with the animation module 118). Identifying separate geologic features represented in the slices may include identifying features having different rates of movement when animated and/or other metrics between slices in the sequence of slices.

The analysis module 116 may be configured to compare sets of geologic features corresponding to the different offset stacks and/or angle stacks. Such a comparison may be performed to determine discrepancies and/or similarities between the sets of geologic features corresponding to the different offset stacks and/or angle stacks. Discrepancies and/or similarities between the sets of geologic features may include, for example, discrepancies and/or similarities in geologic feature position, geologic feature shape, an attribute of a geologic feature, and/or other discrepancies and/or similarities between the sets of geologic features.

The analysis module 116 may be configured to determine one or more causes of the determined discrepancies and/or similarities between the sets of geologic features for the different offset stacks and/or angle stacks. Such causes may include, for example, one or more of a tuning effect of seismic wavelet corresponding to seismic acquisition geometry, a change in a reflection coefficient as a function of impingement angle, a change in reflection coefficient due to non-parallel layering of internal thin beds within a geologic feature, and/or other causes of discrepancies and/or similarities between the sets of geologic features. In some embodiments, the feature identification module 114 may by configured to determined one or more of stratigraphic and/or geomorphologic interpretations, stratigraphic and/or geomorphologic predictions, and/or other interpretations and/or predictions based on one or more of the causes.

The animation module 118 may be configured to generate one or more animations associated with the geologic volume of interest. Such animations may provide a dynamic approach where patterns are identified in a dynamic, rather than static, display. Frames from an exemplary animation are described in connection with FIG. 2. In some embodiments, animation(s) may be generated from a sequence of slices obtained from one or more attribute volumes. The animation module 118 may be configured to generate an animation from a plurality of optical stack volumes such that individual frames include one of the optical stack volumes. In embodiments where the animation module 118 generates an animation from optical stack volumes, successive frames may include a moving range of slices. To illustrate, by way of non-limiting example, a first frame may include slice 1 through slice 5, a second frame may include slice 2 through slice 6, a third frame may include slice 3 through slice 7, and so on.

The animation module 118 may operate in conjunction with the feature identification module 114, in accordance with some embodiments, to identify separate geologic features represented in the slices based on the animation and/or a sequential analysis of the slices. In such embodiments identifying the separate geologic features may include identifying features having different rates of movement, identifying common movement between slices for spatially adjacent regions, and/or other metrics between frames of the animation and/or slices in the sequence of slices.

Figure 2:
FIG. 2 illustrates exemplary identification of geologic features, in accordance with one or more embodiments.
Figure 2:
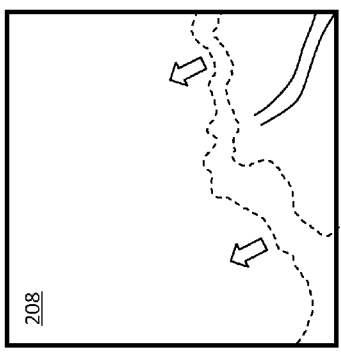
Figure 2:
Figure 2:
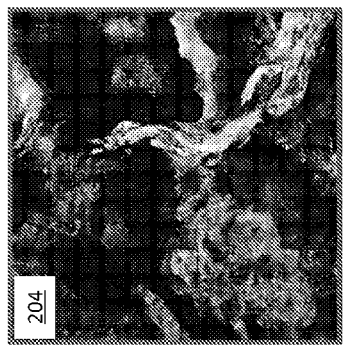
Figure 2:
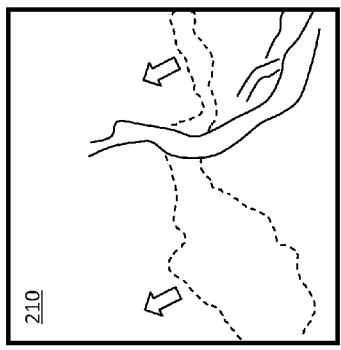
Figure 2:
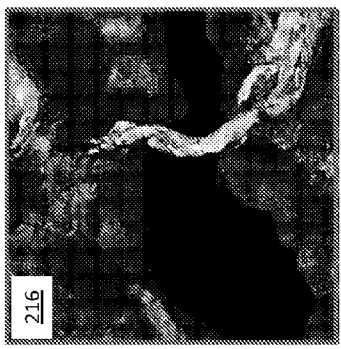
Figure 2:
Figure 2:
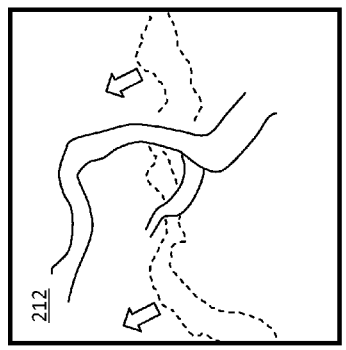
Figure 2:

FIG. 2 illustrates exemplary identification of geologic features, in accordance with one or more embodiments. Panels 202, 204, and 206 may be images or frames extracted from an animation generated by the animation module 118. Panels 202, 204, and 206 may each correspond to a slice of successively greater time. Panels 208, 210, and 212 correspond, respectively, to panels 202, 204, and 206. Dashed lines in panels 208, 210, and 212 outline the intersection between corresponding optical stacks and regional seismic horizons (i.e., "noise"). Solid lines in panels 208, 210, and 212 correspond to a stratigraphically significant geologic feature (i.e., a channel fill). Arrows in panels 208, 210, and 212 indicate the direction of displacement of regional seismic horizons with each successive panel. Components of a seismic volume may be filtered out based on consistency criteria derived from the animation. Examples of such components may include seismic reflections, seismic samples, and/or other components of a seismic volume. Panels 214, 216, and 218 correspond, respectively, to panels 202, 204, and 206 having regional seismic horizons filtered out. Panels 214, 216, and 218 show stratigraphic features more clearly relative to panels 202, 204, and 206.

Figure 3:
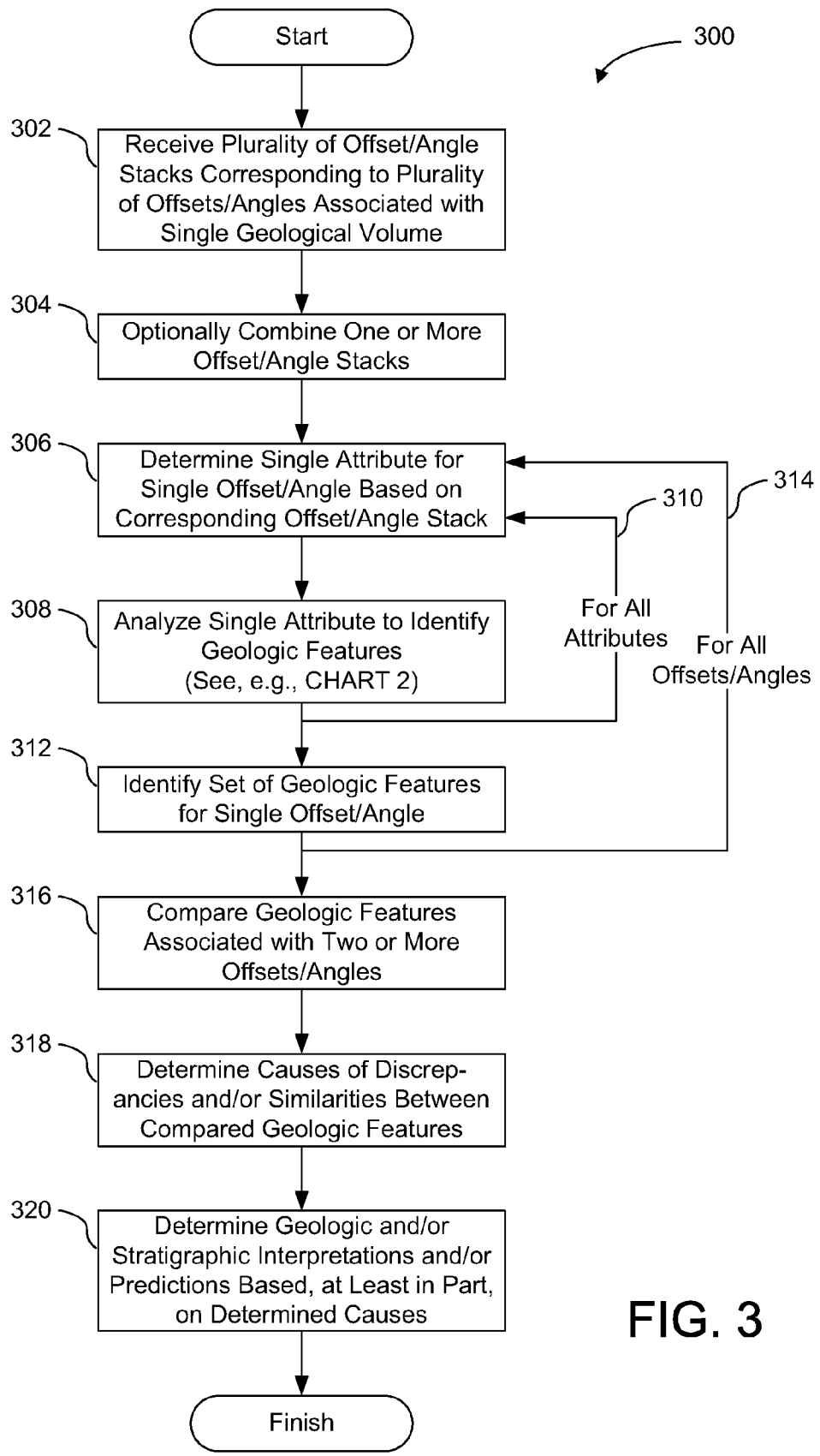
FIG. 3 illustrates a method for extracting geologic information related to a geologic volume of interest by leveraging discrepancies and/or similarities of corresponding geologic features included in a plurality of offset stacks and/or angle stacks associated with the geologic volume of interest, in accordance with one or more embodiments.

FIG. 3 illustrates a method 300 for extracting geologic information related to a geologic volume of interest by leveraging discrepancies and/or similarities of corresponding geologic features included in a plurality of offset stacks and/or angle stacks associated with the geologic volume of interest, in accordance with one or more embodiments. The operations of the method 300 presented below are intended to be illustrative. In some embodiments, the method 300 may be accomplished with one or more additional operations not described, and/or without one or more of the operations discussed. Additionally, the order in which the operations of the method 300 are illustrated in FIG. 3 and described below is not intended to be limiting.

In some embodiments, the method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 300 in response to instructions stored electronically on an electronic storage medium. The one or more processing devices may include one or more devices configured through hardware, firmware, and/or software to be specifically designed for execution of one or more of the operations of the method 300.

At operation 302, a plurality of offset stacks and/or angle stacks are received. The plurality of offset stacks and/or angle stacks may correspond to a plurality of offsets associated with a single geologic volume of interest. In exemplary embodiments, the communications module 110 may be executed to perform operation 302.

At operation 304, one or more offset stacks and/or angle stacks are optionally combined. Operation 304 may be performed through execution of the communications module 110, in some embodiments.

At operation 306, a single attribute volume is determined for a single offset or a single angle range based on a corresponding offset stack or angle stack. The image volume module 112 may be executed to perform operation 306, in accordance with some embodiments.

At operation 308, a single attribute volume is analyzed to identify geologic features. In exemplary embodiments, operation 308 may be performed via execution of the feature identification module 114 and/or one or more other ones of modules 110, 112, 116, and/or 118. One or more operations that may be included in operation 308 are described further in connection with FIG. 4, in accordance with some embodiments.

In loop 310, operations 306 and/or 308 may be iteratively repeated for one or more different attributes. In some embodiments, operations 306 and 308 may be iteratively repeated in loop 310 for all attributes under consideration.

At operation 312, a set of geologic features are identifies for a single offset, the feature identification module 114 may be executed, in some embodiments, to perform operation 312.

In loop 314, operations 306, 308, and/or 312 and/or loop 310 may be iteratively repeated for one or more different offsets. In some embodiments, operations 306, 308, and/or 312 and/or loop 310 may be iteratively repeated in loop 314 for all offsets under consideration.

At operation 316, geologic features associated with two or more offsets are compared. Operation 316 may be performed through execution of the analysis module 116, according to some embodiments.

At operation 318, causes of discrepancies and/or similarities between geologic feature compared at operation 316 are determined. According to various embodiments, operation 318 may be performed by way of execution of the analysis module 116.

At operation 320, geologic and/or stratigraphic interpretations and/or predictions are determined based on one or more causes determined at operation 318. The analysis module 116 may be executed to perform operation 320, in some embodiments.

Figure 4:
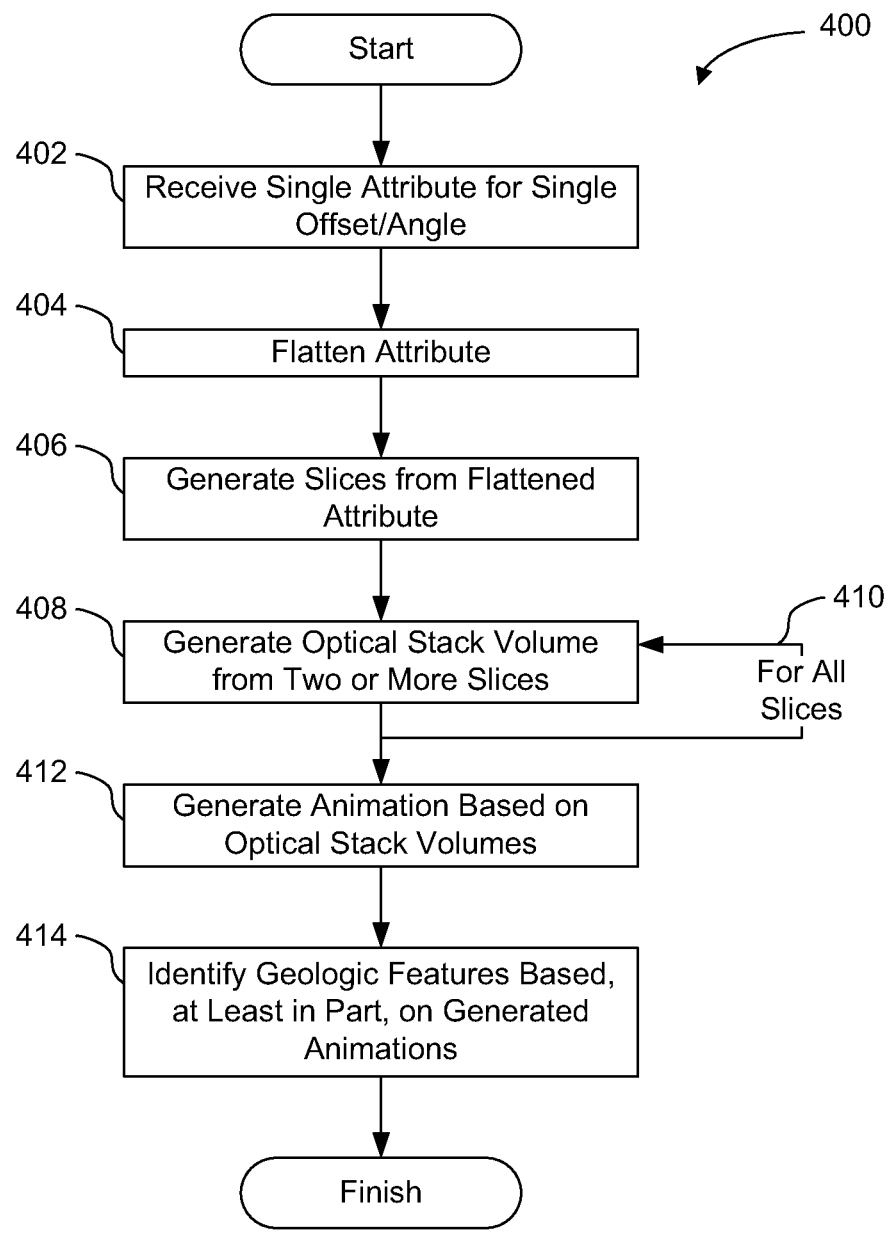
FIG. 4 illustrates a method for analyzing individual attribute volumes to identify geologic features, in accordance with one or more embodiments.

FIG. 4 illustrates a method 400 for analyzing individual attribute volumes to identify geologic features, in accordance with one or more embodiments. One or more operations included in the method 400 may correspond to a single operation or multiple operations described in connection with the method 300 illustrated in FIG. 3. According to some embodiments, one or more operations included in the method 400 may correspond to operation 308 of the method 300. The operations of the method 400 presented below are intended to be illustrative. In some embodiments, the method 400 may be accomplished with one or more additional operations not described, and/or without one or more of the operations discussed. Additionally, the order in which the operations of the method 400 are illustrated in FIG. 4 and described below is not intended to be limiting.

In some embodiments, the method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 400 in response to instructions stored electronically on an electronic storage medium. The one or more processing devices may include one or more devices configured through hardware, firmware, and/or software to be specifically designed for execution of one or more of the operations of the method 400.

At operation 402, a single attribute volume for a single offset is received. According to various embodiments, operation 402 may be performed by executing the communications module 110 or the image volume module 112. In some embodiments, the communications module 110 may be executed in conjunction with the image volume module 112 to perform operation 402.

At operation 404, the attributed volume is flattened. Operation 404 may be performed through execution of the image volume module 112, in some embodiments.

At operation 406, slices are generated from the flattened attribute volume. The image volume module 112 may be executed to perform operation 406, in accordance with some embodiments.

At operation 408, an optical stack volume is generated for a single slice. In some embodiments, operation 408 may be performed by executing the image volume module 112.

In loop 410, operation 408 may be iteratively repeated for one or more different slices. In some embodiments, operation 408 may be iteratively repeated in loop 410 for all slices generated in operation 406.

At operation 412, an animation is generated based on one or more optical stack volumes. The animation module 118 may be executed to perform operation 412, in some embodiments.

At operation 414, one or more geologic features are identified based on the animation generated at operation 412. Identified geologic features may be tagged with metadata. According to various embodiments, operation 414 may be performed by executing the analysis module 116 or the animation module 118. In some embodiments, the analysis module 116 may be executed in conjunction with the animation module 118 to perform operation 414.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

What is claimed is:

1. A computer-implemented method for analyzing attributes to identify geologic features within a geologic volume of interest, the method comprising:
    obtaining an attribute volume representing an attribute of the geologic volume of interest, the attribute volume having been formed from a plurality of offset stacks and/or angle stacks, the stacks representing energy that has propagated through the geologic volume of interest from one or more energy sources to one or more energy receivers, an individual energy source being physically separated from an individual energy receiver by a corresponding source-receiver offset, each individual offset stack being formed by summing a corresponding set of seismic traces having equivalent source-receiver offsets, each individual angle stack being formed by summing a corresponding set of seismic traces having equivalent source-receiver angles;
    flattening the attribute volume according to time, depth, slope, vertical, dip, dip azimuth, horizon, or relative to an interpreted horizon;
    generating a sequence of slices from the flattened attribute volume; and
    identifying separate geologic features represented in the slices based on a sequential analysis of the slices.

2. The method of claim 1, wherein identifying separate geologic features represented in the slices comprises identifying features having different rates of movement between slices in the sequence of slices.

3. The method of claim 1, wherein the sequential analysis of the slices comprises generating an animation from the slices, and identifying geologic features from the generated animation.

4. The method of claim 1, wherein the sequential analysis of the slices comprises generating optical stack volumes corresponding to individual ones of the slices.

5. The method of claim 4, wherein generating the optical stack volumes comprises adjusting the opacity of one or more of the slices and combining the one or more of the slices into a single image.

6. The method of claim 5, wherein the sequential analysis of the slices further comprises:
generating an animation from the optical stack volumes such that individual frames include one of the optical stack volumes; and
identifying geologic features from the generated animation.

7. The method of claim 1, wherein the one or more attributes include one or more of velocity, coherence, Hilbert transform, amplitude, instantaneous frequency, spectral decomposition, anisotropy, attenuation, impedance, density, Poisson's ratio, acoustic properties, elastic properties, petrophysical properties, rock properties, fluid properties, reservoir properties, seismic response, geologic description, lithologic classification, dip, magnitude, curvature, roughness, dip azimuth, or spectral shape.

8. The method of claim 1, wherein the geologic features include one or more of a fluvial channel, delta, deltaic fan, submarine fan, reef, sandbar, point bar, fault, unconformity, dike, sill, salt body, crevasse splay, reservoir flow unit, fluid contact, turbidite channel, or turbidite sheet.

9. The method of claim 1, wherein individual ones of the plurality of offset stacks and/or the plurality of angle stacks include processed data, migrated data, unmigrated data, imaged data, and/or raw data.

10. A system configured to analyze attributes to identify geologic features within a geologic volume of interest, the system comprising:
one or more processors configured to execute computer program modules, the computer program modules comprising:
an image volume module configured to obtain an attribute volume representing an attribute of the geologic volume of interest, the attribute volume having been formed from a plurality of offset stacks and/or angle stacks, the stacks representing energy that has propagated through the geologic volume of interest from one or more energy sources to one or more energy receivers, an individual energy source being physically separated from an individual energy receiver by a corresponding source-receiver offset, each individual offset stack being formed by summing a corresponding set of seismic traces having equivalent source-receiver offsets, each individual angle stack being formed by summing from a corresponding set of seismic traces having equivalent source-receiver angles;
the image volume module further configured to flatten the attribute volume according to time, depth, slope, vertical, dip, dip azimuth, horizon, or relative to an interpreted horizon;
the image volume module further configured to generate a sequence of slices from the flattened attribute volume; and
a feature identification module configured to identify separate geologic features represented in the slices based on a sequential analysis of the slices.

11. The system of claim 10, wherein the feature identification module is configured to identify the separate geologic features represented in the slices, at least in part, by identifying features having different rates of movement between slices in the sequence of slices.

12. The system of claim 10, further comprising an animation module configured to generate an animation from the slices, wherein the feature identification module is configured to identify geologic features from the generated animation, and wherein the sequential analysis of the slices comprises the identifying of the geologic features from the generated animation.

13. The system of claim 10, wherein the image volume module is further configured to generate optical stack volumes corresponding to individual ones of the slices, and wherein the sequential analysis of the slices comprises the generating of the optical stack volumes.

14. The system of claim 13, wherein the image volume module is configured to generate the optical stack volumes, at least in part, by adjusting the opacity of one or more of the slices, and by combining the one or more of the slices into a single image.

15. The system of claim 14, further comprising:
an animation module configured to generate an animation from the optical stack volumes such that individual frames include one of the optical stack volumes, wherein the sequential analysis of the slices includes the generating of the animation; and
wherein the feature identification module is configured to identify geologic features from the generated animation, wherein the sequential analysis of the slices includes the identifying of the geologic features from the generated animation.

16. The system of claim 10, wherein the one or more attributes include one or more of velocity, coherence, Hilbert transform, amplitude, instantaneous frequency, spectral decomposition, anisotropy, attenuation, impedance, density, Poisson's ratio, acoustic properties, elastic properties, petrophysical properties, rock properties, fluid properties, reservoir properties, seismic response, geologic description, lithologic classification, dip, magnitude, curvature, roughness, dip azimuth, or spectral shape.

17. The system of claim 10, wherein the geologic features include one or more of a fluvial channel, delta, deltaic fan, submarine fan, reef, sandbar, point bar, fault, unconformity, dike, sill, salt body, crevasse splay, reservoir flow unit, fluid contact, turbidite channel, or turbidite sheet.

18. The system of claim 10, wherein individual ones of the plurality of offset stacks and/or the plurality of angle stacks include processed data, migrated data, unmigrated data, imaged data, and/or raw data.

19. A computer-readable storage medium having instructions embodied thereon, the instructions being executable by a processor to perform a method for analyzing attributes to identify geologic features within a geologic volume of interest, the method comprising:
obtaining an attribute volume representing an attribute of the geologic volume of interest, the attribute volume having been formed from a plurality of offset stacks and/or angle stacks, the stacks representing energy that has propagated through the geologic volume of interest from one or more energy sources to one or more energy receivers, an individual energy source being physically separated from an individual energy receiver by a corresponding source-receiver offset, each individual offset stack being formed by summing a corresponding set of seismic traces having equivalent source-receiver offsets, each individual angle stack being formed by summing a corresponding set of seismic traces having equivalent source-receiver angles;
flattening the attribute volume according to time, depth, slope, vertical, dip, dip azimuth, horizon, or relative to an interpreted horizon;

generating a sequence of slices from the flattened attribute volume; and identifying separate geologic features represented in the slices based on a sequential analysis of the slices.

20. The computer-readable storage medium of claim 19, wherein identifying separate geologic features represented in the slices comprises identifying features having different rates of movement between slices in the sequence of slices.

21. The computer-readable storage medium of claim 19, wherein the sequential analysis of the slices comprises generating an animation from the slices, and identifying geologic features from the generated animation.

22. The computer-readable storage medium of claim 19, wherein the sequential analysis of the slices comprises generating optical stack volumes corresponding to individual ones of the slices.

23. The computer-readable storage medium of claim 22, wherein generating the optical stack volumes comprises adjusting the opacity of one or more of the slices and combining the one or more of the slices into a single image.

24. The computer-readable storage medium of claim 23, wherein the sequential analysis of the slices further comprises:

generating an animation from the optical stack volumes such that individual frames include one of the optical stack volumes; and identifying geologic features from the generated animation.

25. The computer-readable storage medium of claim 19, wherein the one or more attributes include one or more of velocity, coherence, Hilbert transform, amplitude, instantaneous frequency, spectral decomposition, anisotropy, attenuation, impedance, density, Poisson's ratio, acoustic properties, elastic properties, petrophysical properties, rock properties, fluid properties, reservoir properties, seismic response, geologic description, lithologic classification, dip, magnitude, curvature, roughness, dip azimuth, or spectral shape.

26. The computer-readable storage medium of claim 19, wherein the geologic features include one or more of a fluvial channel, delta, deltaic fan, submarine fan, reef, sandbar, point bar, fault, unconformity, dike, sill, salt body, crevasse splay, reservoir flow unit, fluid contact, turbidite channel, or turbidite sheet.

27. The computer-readable storage medium of claim 19, wherein individual ones of the plurality of offset stacks and/or the plurality of angle stacks include processed data, migrated data, unmigrated data, imaged data, and/or raw data.

* * * * *